Patented Nov. 4, 1924.

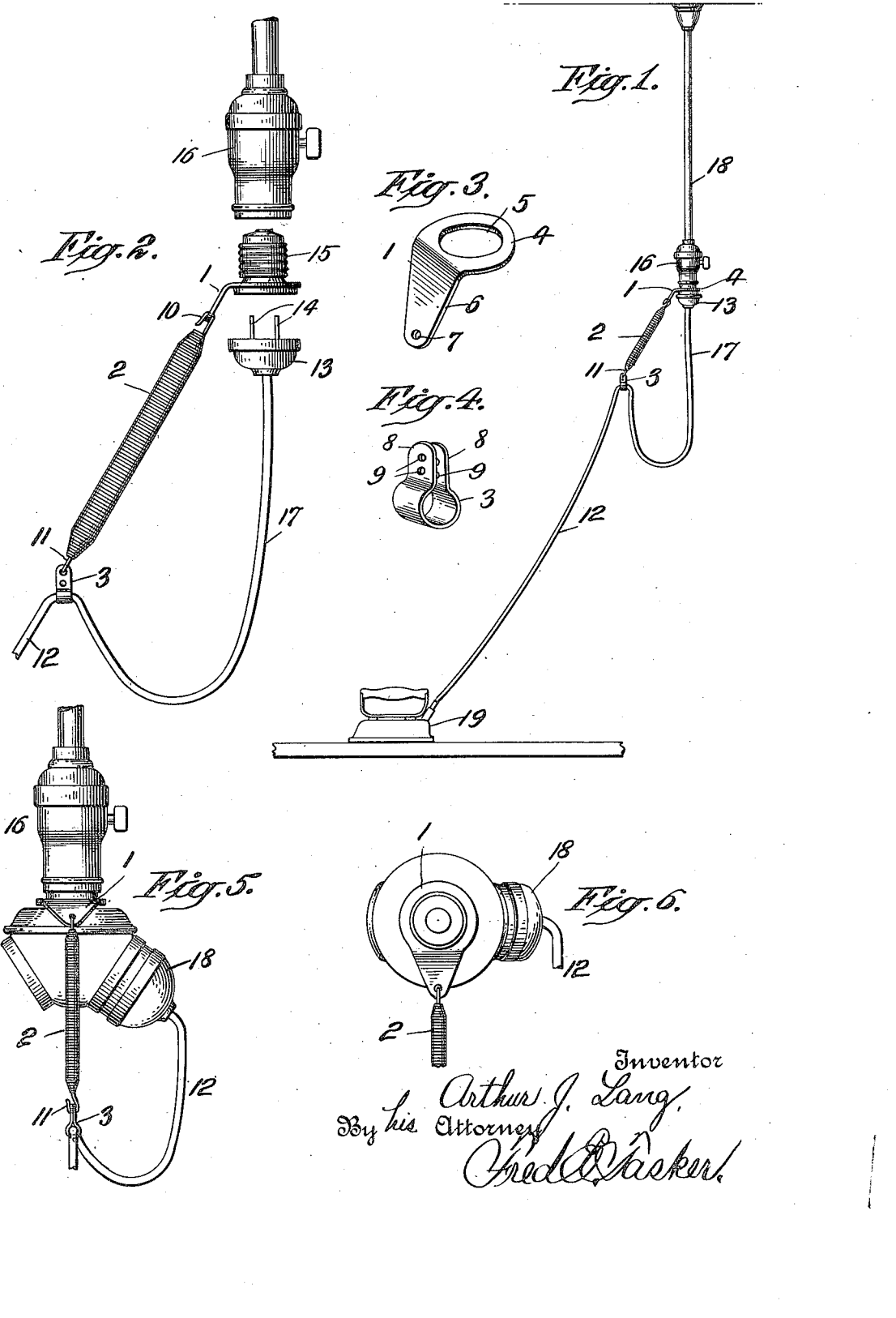

1,514,544

UNITED STATES PATENT OFFICE.

ARTHUR J. LANG, OF NEW YORK, N. Y.

AUTOMATIC CORD ADJUSTER.

Application filed May 12, 1921. Serial No. 468,908.

*To all whom it may concern:*

Be it known that I, ARTHUR J. LANG, a citizen of the United States, and resident of New York, in the county of Bronx and State of New York, have invented a certain new and useful Improvement in Automatic Cord Adjusters, of which the following is a specification, reference being had therein to the accompanying drawing.

This invention relates to an automatic cord adjuster for electric appliances, and more particularly to a slack take-up means for conductors or cords used for connecting electric appliances such as sad-irons or the like to an electric power fixture, and has special reference to the provision of a cord adjuster or slack take-up means effective for permitting extension and recession of the cord in the use of the appliance with the support for and slack in the cord effectively controlled.

A prime desideratum of my present invention comprehends the provision of a slack controlling or take-up means for cords or similar conductors of current, fuel or other power such as are commonly used with sad-irons, vacuum cleaners, lamps, motors and similar appliances, effective for taking up the slack or looseness in the cord, for permitting extension or expansion and recession or contraction of the cord as the appliance is manipulated by an operator and the distance between the same and the power fixture changed in the normal use of the same, and for effectively supporting the cord so that the weight of the latter is supported on the fixture and the pulling strains thereon incident to extension thereof is transmitted to the fixture to prevent the cord from being accidentally pulled out or detached from the fixture in the use of the appliance.

To the accomplishment of the foregoing and such other objects as may hereinafter appear, my invention consists in the elements and their relation one to the other, as hereinafter particularly described and sought to be defined in the claims, reference being had to the accompanying drawings.

In the accompanying drawing illustrating my invention:

Figure 1 is a side elevation of my improved automatic cord adjuster shown applied for use with an electric fixture and an electric cord connected to an electric iron.

Figure 2 is an enlarged side view of the parts of the adjuster separated from each other so as to indicate their relative positions in assembling.

Figure 3 is a detail perspective view of the spring support, which is adapted to be held between the parts of an electric fixture.

Figure 4 is a detail perspective view of the loop or clamp adapted to clamp an electric cord at the desired point.

Figure 5 is a partial side elevation of a cluster electric fixture having side outlets and showing my improved device applied thereto.

Figure 6 is a partial plan view of the same to indicate the location of the spring support with a cluster fixture of this kind.

Similar characters of reference designate corresponding parts throughout the different figures of the drawing.

Although I have shown my invention as applied to and used with electric fixtures and sad-irons, it will be understood that the invention is broadly capable of use with other fixtures and other household or similar appliances, a preferred form of the invention and a preferred mode of use thereof being exemplified in the drawings. An example of such a fixture is shown in Figure 1, consisting of a depending rod or tube 18 which may be affixed to the ceiling of a room or otherwise and which carries at its lower end an electric fixture such as the socket 16 into which screws a plug 15, with which plug it is common to use a detachable slip fit or snap-plug 13 having contact pins or prongs 14 that spring into receiving recesses in the plug 15. The electric fixture, therefore, which I set forth here as a common type of device with which my invention may be employed, consists of the fixture proper 16, a screw plug 15 and a detachable slip fit or snap-plug 13. To the latter plug is connected an electric cord 12 to which is attached any device or applicance such as a sad iron which is to be operated. Plug 13 may be omitted.

For the purpose of explaining the application of the invention I have indicated in the drawings an electric iron 19, to which a cord, wire, cable or other conductor 12 is attached for connection to an electric power fixture. In the process of "ironing," it will be understood that the position of the iron relative to the fixture and the distance between the same are constantly varied, considerable looseness and slack in the cord being necessary to permit of easy "ironing" operation. To permit ease and facility in the "ironing" operation, the invention comprehends means for automatically taking up the looseness or slack in the cord, the construction being such that the cord and its attached plug 13 are suitably supported on the power fixture to prevent accidental disconnecting of the cord, the weight of the cord being sustained and the pulling strains on the cord incident to the normal use thereof being transmitted to and sustained by the fixture.

In order to accomplish the results therefore I preferably use a spiral or helical spring 2 which is arranged to take up the slack loop 17, as shown in Figures 1 and 2. This spring 2 may be of greater or less length and of any desired diameter. With the spring 2 I preferably employ two other parts, a spring holder 1 and a loop or clamp 3. These two parts are preferably made out of fibre, for which any other suitable material may be substituted as desired, but it is very preferable that they should be of insulating material in order to avoid any possibility of short-circuiting should the cord 12 become worn or the parts of the fixture become loose. The spring support 1 consists of a ring 4 within which is a circular opening 5 and integral with the ring 4 is an inclined projection 6 having a perforation or arm 7 in the outer end thereof which is adapted to be engaged by the hook 10 on the upper end of the spring 2. This holder or support 1 is clamped between the screw plug 15 and the main fixture 16. When the plug 15 is removed from the fixture 16, the screw-threaded section thereof can be passed through the opening 5 in the support 1, and then when the plug 15 is screwed tightly into the fixture 16 the support 1 will be held firmly between the lower flanged end of plug 15 and fixture 16 and thus be held in position, thus providing a projecting arm 6 which is adapted to carry loosely the upper end of the spring 2, the latter being capable of rotation more or less as the cord swings.

In order that the other end of the spring 2, which is provided with the hook 11, may be connected with the electric cord 12 at some suitable point below the loop 17, I utilize a clamp or loop 3, consisting of a short sleeve through which the cord 12 passes, said sleeve having parallel ears or flanges 8 provided with a series of holes 9. The hook 11 of the spring 2 engages a pair of opposite holes in the ears 8. By having a series of these holes it is possible to use the loop 3 with cords of varying sizes, because it is quite necessary that the hold thereon should be firm and that there should be very little, if any, slipping. By making the loop of fibre, or similar flexible material, it can easily be clamped around the cord 12, and the diameter of the sleeve portion will be such that when the hook 11 engages the perforated ears, the sleeve will bind with the proper degree of tightness around the cord.

Thus the three preferred parts of my improved cord adjusting device will be seen to comprise a spring support firmly held by an electric fixture or outlet, an extensible elongated spring device hooked or otherwise engaged therewith, and a loop or clamp which engages the electric cord, to which latter the other end of the spring device is suitably attached, the said two devices engaged by the spring preferably consisting of fiber or other insulating material in order to prevent short-circuiting troubles. It will be apparent, however, that these devices or connecting parts may be made of any other suitable material.

In Figures 5 and 6 I have shown the device applied to a cluster fixture, all the parts being substantially the same except that the fixture 16 is provided with two or more side outlet plugs 18 and in this case the strain which comes from the manipulation of the cord prevents the plugs 18 from being unscrewed no matter in which direction it may be pulled. Obviously there may be as many outlets from the fixture 16 as are desired and the spring support 1 will be arranged in connection therewith in substantially the same manner as it is in Figures 1 and 2.

The operation and use of the device will in the main be apparent from the above detailed description thereof. As the electric iron 19 or any similar appliance is moved back and forth, the slack in the electric cord will be compensated for and controlled by the resilient action of the extensible and contractable spring device 2. It will be further apparent that by the provision of the slack take-up means of my invention, not only is the slack compensated for or taken up, but that extension and recession of the cord in the use of the sad-iron or other appliance is effectively permitted, that the weight of the cord is suitably supported, and that pulling strains thereon incident to use thereof are suitably transmitted to the power fixture to prevent the cord from being accidentally disconnected from the said fixture.

While I have shown my device in the preferred form, it will be obvious that many changes and modifications may be made in the structure disclosed without departing from the spirit of the invention, defined in the following claims.

Having thus described my invention, what I claim as new and desire to secure by Letters Patent is:

1. In combination with a conducting cord, a snap or slip fit plug attached thereto and a screw plug removably receiving the snap plug, of means for taking up or adjusting for the slack in the cord effective for permitting extension and recession of the same, the said means comprising an expansible and contractable element connecting an intermediate point of the cord to the screw plug.

2. In combination with an electric appliance, an electric fixture and a conducting cord connecting the appliance to the fixture, of means for taking up and adjusting for the slack in the cord effective for permitting extension and recession of the cord in the use and operation of the appliance, the said means comprising a device supported on said fixture, a clamp encircling the cord, and a spring connecting said clamp and said device and operative for taking up the cord slack therebetween and for transmitting pulling strains on the cord to the fixture, and means whereby said cord may be removably attached to said device without interfering with the spring connection between the clamp and the device.

3. In combination with a conducting cord, a snap or slip fit plug attached thereto and a screw plug removably receiving the snap plug, of means for taking up or adjusting for the slack in the cord, the said means comprising provisions connected at one end to the screw plug and at the other end to an intermediate point of the cord.

4. In combination with an electric fixture including a screw plug and a cord running therefrom, of a spring support fixedly carried in said fixture and consisting of a ring for fitting the screw plug and having an angular projecting perforated arm, a clamp embracing the cord and consisting of a sleeve with parallel perforated ears, and a spring device having hooked ends engaging the sleeve on the cord and the said spring support.

In testimony whereof I hereunto affix my signature.

ARTHUR J. LANG.